United States Patent [19]
Bryson

[11] 4,082,326
[45] Apr. 4, 1978

[54] COMPRESSIBLE MEMBER FOR USE IN COMPRESSION JOINT PIPE CONNECTOR

[75] Inventor: Cecil Walsh Bryson, Cambridge, Canada

[73] Assignee: Canadian Brass Limited, Cambridge, Canada

[21] Appl. No.: 717,772

[22] Filed: Aug. 30, 1976

[51] Int. Cl.$^2$ ............................................. F16L 33/00
[52] U.S. Cl. .................................. 285/238; 285/342; 285/348
[58] Field of Search .............. 285/340, 341, 342, 343, 285/322, 323, 348, 105, 238

[56] References Cited

U.S. PATENT DOCUMENTS

| | | | |
|---|---|---|---|
| 2,201,372 | 5/1940 | Miller | 285/105 |
| 2,203,237 | 6/1940 | Raybould | 285/341 |
| 3,219,751 | 11/1965 | Pfendler et al. | 285/340 X |
| 3,291,510 | 12/1966 | Kody | 285/240 |
| 3,596,933 | 8/1971 | Luckenbill | 285/348 X |

FOREIGN PATENT DOCUMENTS

| | | | |
|---|---|---|---|
| 579,377 | 7/1959 | Canada | 285/348 |
| 1,335,121 | 7/1963 | France | 285/340 |

*Primary Examiner*—Dave W. Arola

[57] ABSTRACT

A re-useable compression type pipe connector comprises threaded male and female portions, a retaining ring and a sealing ring. The retaining ring has a hollow, truncated cone-shaped body portion with a plurality of circumferentially spaced-apart slits which extend in an axial direction inwardly from the smaller end of the retaining ring to define a plurality of gripping teeth. The sealing ring has a tubular shaped body portion, the axial length of the sealing ring being substantially longer than the axial length of the body portion of the retaining ring. The threaded portion receiving the end of the pipe has an annular inwardly-sloping surface which overlaps a portion of the retaining ring. The outside diameter of the sealing ring is such that the outside surface thereof slidably contacts the annular inwardly-sloping surface to exert an inwardly-directed force on the body portion of the retaining ring when the connector is assembled on a pipe. The gripping teeth are at a low angle relative to the pipe surface so that the gripping teeth do not substantially mar the pipe surface. An annular portion of the sealing ring which projects beyond the smaller end of the retaining ring is simultaneously moved radially inwardly by the annular inwardly-sloping surface so that the inside surface of the sealing ring intimately contacts the circumference of the pipe to form a fluid-tight seal therearound. The circumferential length of the free end of each gripping tooth is sufficient to provide substantially more than point contact with a pipe surface.

6 Claims, 3 Drawing Figures

U.S. Patent   April 4, 1978   4,082,326
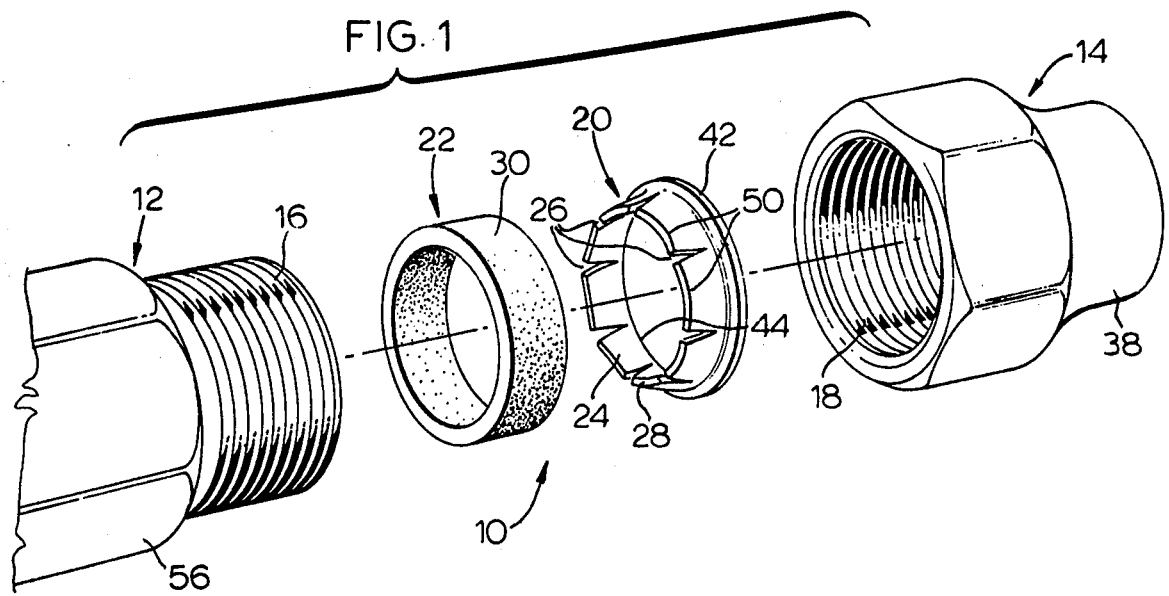
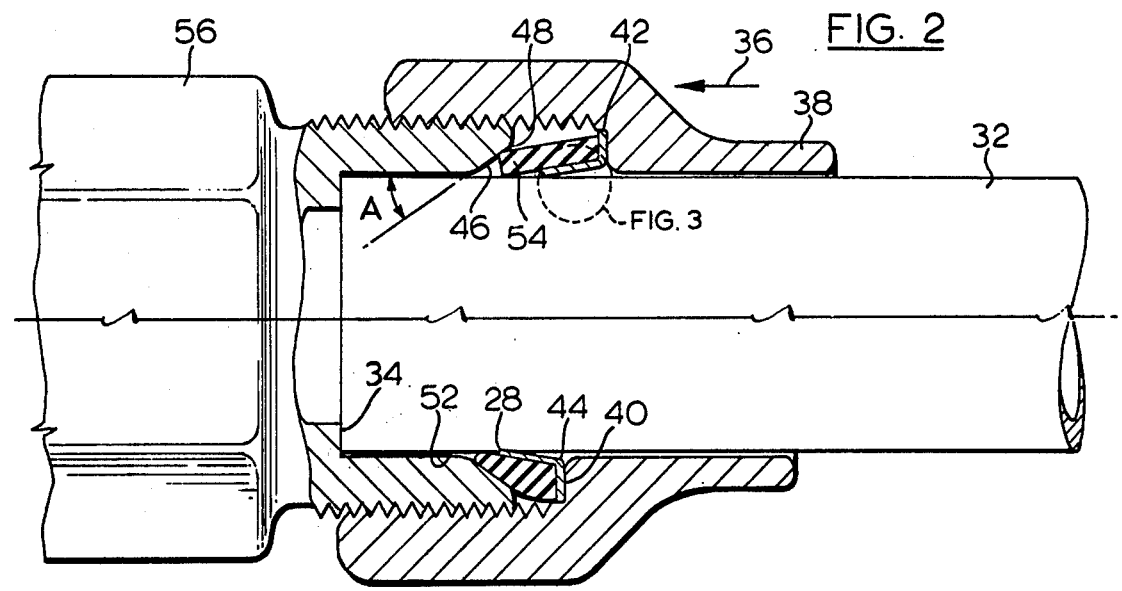
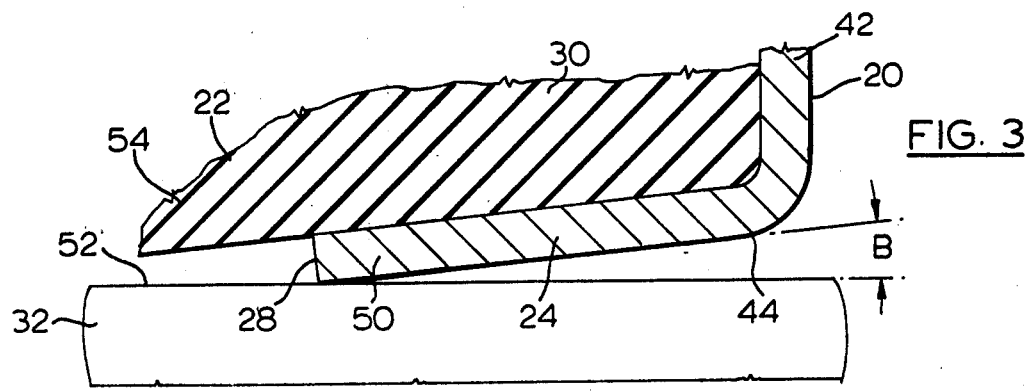

COMPRESSIBLE MEMBER FOR USE IN COMPRESSION JOINT PIPE CONNECTOR

FIELD OF THE INVENTION

This invention relates to a re-useable compression type pipe connector which releasably connects a pipe to another pipe or to a service outlet to provide a fluid-tight seal therebetween.

BACKGROUND OF THE INVENTION

A problem often encountered in connecting a pipe to another pipe requiring a fluid-tight seal, is providing a sealing device for the pipe connector which readily conforms to the surface of the pipe to be connected without damaging the exterior surface of the pipe. It is usually found that a pipe connector gouges or mars the exterior surface of the pipe to the extent that the connector cannot be reused on the pipe. Work in the field may entail disconnecting a pipe with subsequent reconnection. With a connector which substantially gouges or mars the pipe surface, a water-tight reconnection cannot be achieved, therefore the damaged pipe end has to be cut off and a new connector used for reconnection. An example of such a connector is disclosed by Kody, U.S. Pat No. 3,291,510, where the retaining ring meets the pipe surface at a substantially high angle relative to the pipe surface and where the sealing ring exerts a force on the retaining ring in such a manner that the ring gouges the pipe surface.

It is therefore an object of the invention to provide a reusable compression type pipe connector having a retaining ring and a sealing ring. The connector releasably retains the pipe within the connector and effects a fluid-tight seal around a pipe which has either a smooth wall or disconformities therein.

It is another object of the invention to provide a reusable compression type pipe connector wherein its retaining ring has gripping teeth which meet the pipe surface at a low angle. The portion of the connector which receives the pipe has an annular inwardly sloping surface overlapping a portion of the retaining ring to exert an inwardly directed force on the retaining ring to move the gripping teeth into contact with the pipe. This contact with the pipe retains it within the connector without substantially gouging or marring the pipe surface.

It is a further object of the invention to provide a reusable compression type pipe connector wherein the circumferential length of the free ends of the gripping teeth are sufficient to provide substantially more than point contact with the pipe surface so as to preclude gouging and marring of soft piping, such as plastic pipe.

SUMMARY OF THE INVENTION

These advantages and features of the invention are realized in providing a reusable compression type pipe connector comprising threaded male and female portions, one of which receives a pipe end, and a sealing and pipe retaining means. The retaining ring consists of a resilient material having a hollow truncated cone-shaped body portion with a plurality of resilient gripping teeth, each having a free end. The sealing ring consists of an elastomeric material and has a tubular shape which is substantially longer than the axial length of the retaining ring. The sealing ring is in surrounding and contacting relationship with the outside surface of the retaining ring where the sealing ring covers the slits between the gripping teeth in the retaining ring. The gripping teeth of the retaining ring are disposed at a low angle relative to the pipe surface, the angle ranging from approximately 5° to 30°.

The threaded male or female portion which receives the pipe end has an annular inwardly sloping surface which engages the outside surface of the sealing ring when the connector is assembled on a pipe end. The annular inwardly sloping surface overlaps a portion of the gripping teeth so that the sealing ring exerts an inwardly directed force on the gripping teeth to move them into contact with the pipe surface. Each gripping tooth free end has a circumferential length to provide substantially more than point contact with the pipe surface. The arrangement of the components of the pipe connector is such that the gripping teeth free ends are precluded from substantially marring or gouging a pipe surface when the teeth are in contact therewith. The connector is therefore reusable in forming a fluid-tight seal around a pipe end previously engaged by the connector.

The invention therefore provides a connector having a retaining ring with resilient gripping teeth positioned at a low angle relative to the pipe surface. The annular inwardly sloping pipe surface of the male or female connector component overlaps a portion of the gripping teeth to provide an inwardly directed force on the gripping teeth to move them into contact with the pipe surface during assembly of the connector on a pipe. The sealing ring surrounds the gripping teeth and covers the slits of the retaining ring to provide a fluid-tight seal around the pipe. The low contact angle of the gripping teeth relative to the pipe surface precludes the connector from substantially marring the pipe surface when assembled so that the connector may be reused on a pipe end for purposes of a reconnection. Such a connector is not provided by Kody, U.S. Pat. No. 3,291,510.

BRIEF DESCRIPTION OF THE DRAWINGS

These and other objects, advantages and features of the invention will become apparent in the detailed description of the preferred embodiments of the invention as shown in the drawings wherein:

FIG. 1 is an exploded view of a compression type pipe connector according to a preferred embodiment of the invention;

FIG. 2 is a partially sectioned view of the compression type pipe connector shown in FIG. 1 where the upper portion of the section shows the connector partially assembled and the lower section shows the connector assembled on a pipe; and FIG. 3 is an enlarged view showing the angle of contact between the retaining ring and the surface of a pipe.

DETAILED DESCRIPTION OF THE PREFERRED EMBODIMENTS

A preferred embodiment of the invention is shown in the drawings. In FIG. 1 a connector 10 comprises a threaded male portion 12 and a correspondingly threaded female portion 14. Each of the male and female portions has an axial bore to accommodate a pipe inserted therein in the manner shown in FIG. 2. The male portion 12 receives an end of a pipe and has an external thread 16.

The female portion 14 has an internal thread 18 which is adapted to threadably engage the external thread 16 to advance female portion 14 relative to male portion 12 upon positive rotation thereof. The female member 14 surrounds a pipe inserted in the male member 12 in the manner shown in FIG. 2.

The retaining and sealing means of the connector 10 comprises a retaining ring 20 and a sealing ring 22. The retaining ring 20 consists of a resilient material, for example, 70/30 half hard yellow brass which is deformable if stressed beyond its elastic limit. The retaining ring has a tapered body portion 24 of the shape of a hollow truncated cone. In the body portion 24 there are a plurality of circumferentially spaced-apart V-shaped slits 26 which extend in an axial direction inwardly from the small end of the retaining ring into the body portion 24. The V-shaped slits open outwardly towards the smaller end of the tapered body portion 24.

The sealing ring 22 consists of an elastomeric material, for example, neoprene. The body portion of the sealing ring 22 has a hollow cylindrical shape where the axial length of the body portion 30 is substantially longer than the axial length of the body portion 24 of the retaining ring 20. Such difference in length is shown more clearly in FIG. 2.

A pipe 32 is inserted in an open end of the male portion 12 as far as positioning shoulder 34 as shown in FIG. 2. The retaining and sealing rings 20 and 22 are placed together and inserted within female portion 14 over the pipe 32 and partially assembled as shown in the top section of FIG. 2. The connection is completed when the female portion 14 is rotated in a positive direction to advance the female portion relative to the male portion in the direction of arrow 36 to form a fluid-tight seal between the surface of the pipe and the connector and retain the pipe 32 within the connector.

The retaining ring 20 has an inside diameter at the smaller end thereof which is approximately equal to or slightly greater than the outside diameter of the pipe 32 so that the retaining ring surrounds the pipe as shown in section in FIG. 2.

The sealing ring 22 has an inside diameter approximately equal to the outside diameter of the smaller end of the retaining ring because the sealing ring is cylindrical in shape. Due to the elastomeric properties of the sealing ring 22, it is easily stretched to fit over the outside surface of the body portion 24 of the retaining ring in the manner shown in FIG. 2 so that the sealing ring is positioned in surrounding and contacting relationship with the outside surface of the retaining ring. It is understood, however, that the sealing ring may be molded to conform to the varying outside dimensions of the outside surface of the body portion 24 of the retaining ring. For example, the inside surface of the sealing ring may have the shape of the outside surface of a truncated cone. It is also understood that the sealing ring may be integrally molded with the retaining ring and the molded unit would have a cross-section similar to that of the sealing and retaining ring shown in the top section of FIG. 2.

The female member 14 is provided with a tail piece 38 and the inside surface thereof merges into an annular shoulder 40. The retaining ring 20 has a flange 42 at the larger end 44 thereof where the outside diameter of the flange 42 is slightly less than the outside diameter of annular shoulder 40 so that the flange 42 contacts the annular shoulder 40 upon advancement of the female member 14 relative to the male member 12. The longitudinal axis of the retaining ring is approximately coincident with the longitudinal axis of the female member 14. The sealing ring 22 contacts the inside surface of the flange 42 when the retaining ring is inserted in the sealing ring 22. The flange 42 prevents the sealing ring 22 from contacting the annular shoulder 40.

The V-shaped slits 26, define a plurality of gripping teeth 50. Each gripping tooth 50, has a free end 28, where the circumferential length of each free end 28 is sufficient to provide substantially more than point contact with the pipe surface.

As shown in FIG. 3, the incline of the outside surface of the body portion 24 of the retaining ring is represented by angle B. The gripping teeth 50 contact the pipe surface at angle B which is a very low contact angle and ranges from approximately 5° to 30° relative to longitudinal axis of the retaining ring. Correspondingly the annular inwardly sloping surface 46 is at an angle represented by angle A, as shown in FIG. 2. Angle A may range from approximately 20° to 60° relative to the longitudinal axis of the male member 12.

The outside diameter of sealing ring 22 is slightly less than the diameter at point 48 on the sloping surface 46, so that the outside surface of the sealing ring slidably contacts the annular inwardly sloping surface 46 to exert an inwardly directed force on the gripping teeth 50. As the female member is advanced the sloping surface 46 overlaps the gripping teeth 50, in the manner shown in the lower half of FIG. 2. Due to the low contact angle B with such advancements of the female portion 14, the gripping teeth 50 are moved inwardly so as to bring them into contact with the periphery of the pipe 32. With the engagement of the free end 28 of the gripping teeth 50 with the pipe periphery, the pipe 32 is retained within the connector. It is understood of course that upon further advancement of the female member 14, the retaining ring is forced further inwardly into the pipe wall and may, upon sufficient exertion of torque on the collar 14, form an annular depression in the pipe wall. However, due to the low contact angle of the gripping teeth 50, with the periphery of the pipe, the teeth do not substantially gouge or mar the pipe surface, so that the connector may be disconnected and reconnected without having to cut the pipe end off.

The annular portion 54 of the sealing ring which projects beyond the smaller end of retaining ring 20 as shown in FIG. 2, is moved inwardly by the annular inwardly-sloping surface 46 simultaneously with the advancement of female member 14 in the direction of arrow 36 so that the inside surface of the sealing ring intimately contacts the circumference of the pipe to form a fluid-tight seal therearound in the manner shown in the lower portion of FIG. 2. Because of this inward compression of the sealing ring 22 around the circumference of the pipe 32, most disconformities in the pipe surface, such as indentations, scratches, etc. are sealed by the sealing ring 22 because of the ability of the elastomeric material to accommodate imperfections in the surface of the pipe.

As mentioned hereinabove, the retaining ring 20 may be made from a material such as 70/30 half hard yellow brass which, when formed as shown in FIG. 1, has a degree of resiliency, yet it is deformable when subjected to considerable stress, so that when the elastomeric sealing ring 22 exerts an inwardly-directed force on the retaining ring, it may be slightly deformed as the retaining ring contacts the pipe surface. Upon taking the connector apart, the retaining ring can be expanded outwardly to permit removal of the retaining ring from the pipe. Because of the low contact angle of the retaining ring relative to the exterior surface of the pipe 32, the pipe surface is not extensively marred when the connector 10 is tightened properly.

In addition, because of the low contact angle of the retaining ring 20, in other words, angle B of FIG. 3, the connector 10 may be pre-assembled in the condition shown in the upper portion of FIG. 2 and the pipe 32 subsequently inserted within the connector as far as positioning shoulder 34 in the male member 12. The female member 14 is tightened to effect a fluid-tight seal around the exterior surface of the pipe 32.

It is sometimes desirable to pass an electrical current through a metal water pipe to thaw frozen water in the pipe. The connector according to this invention permits the passing of electrical current through a metal pipe. The retaining ring permits electrical current to pass from the pipe to the female member 14 because it contacts both the pipe and member 14. Electrical current can travel onto another pipe because member 12 is connected to member 14 so that a similar connection on the other side of member 12 permits an electrical current flow from pipe to pipe.

The sealing and retaining means according to this invention provides for a compression type pipe connector which permits sealed connections of one pipe to another where the enlarged body portion 56 of the male member 12 as shown in FIG. 2 may be identical on the other side thereof to accommodate a pipe inserted from the other end; or the body portion 56 may be connected to a service outlet or the like.

The exterior surfaces of male and female members 12 and 14 are provided with hexagonal surfaces to permit the use of a pipe wrench in the tightening of the connector 10 to secure the pipe 32 therein.

The features of this reusable connector, namely a retaining ring having resilient gripping teeth at a low angle relative to the pipe surface where the annular inwardly sloping surface of the connector component overlaps a portion of the gripping teeth, provides an inwardly directed force on the gripping teeth to bring the gripping teeth into contact with the pipe surface without substantially gouging or marring the pipe surface. The sealing ring surrounds the gripping teeth and covers the slits therein so as to provide a fluid-tight seal around the pipe. Such an arrangement of the components of this invention provides a reusable connector for piping.

Although various preferred embodiments of the invention have been described herein in detail, it is understood by those skilled in the art that variations may be made thereto without departing from the spirit of the invention or the scope of the appended claims.

I claim:

1. In a re-useable compression type pipe connector having threaded male and female portions, one of which receives a pipe end; a sealing and pipe retaining means comprising a retaining ring consisting of a resilient material and having a hollow, truncated cone shaped body portion with a plurality of circumferentially spaced apart slits which extend in an axial direction inwardly from the smaller end of said retaining ring into the body portion thereof to define a plurality of resilient gripping teeth, each having a free end, and a sealing ring consisting of an elastomeric material and having a tubular shape; said gripping teeth being disposed at a low angle relative to the pipe surface, said angle ranging from approximately 5° to 30°; the axial length of said sealing ring being substantially longer than the axial length of said body portion of said retaining ring; said sealing ring being in surrounding and contracting relationship with the outside surface of said retaining ring where said sealing ring covers said slits in said retaining ring; the threaded portion which receives such pipe end having an annular inwardly sloping surface for engaging the outside surface of said sealing ring when said connector is assembled on a pipe end, the other portion having an internal shoulder means for engaging said body portion of said retaining ring, said annular inwardly sloping surface overlapping a portion of said gripping teeth so that as said male and female portions are threadably engaged to thereby move said internal shoulder towards said annular inwardly sloping surface, said annular inwardly sloping surface engages the outside surface of said sealing ring and causes an annular portion of said sealing ring to exert an inwardly directed force on said gripping teeth therebeneath to move them into contact with a pipe surface and simultaneously the annular portion of said sealing ring beyond said gripping teeth is moved into sealing arrangement with such pipe; each gripping tooth free end having a circumferential length to provide substantially more than point contact with a pipe surface, the arrangement of said connector being such that said gripping teeth free ends are precluded from substantially marring a pipe surface when said teeth are in contact therewith whereby the connector is re-useable to form a fluid tight seal around a pipe end previously engaged by said connector.

2. In a compression type pipe connector of claim 1, said retaining ring consisting of brass.

3. In a compression type pipe connector of claim 1, said retaining ring consisting of a plastics material when a plastic pipe is to be connected.

4. In a compression type pipe connector of claim 1, said sealing ring consisting of neoprene.

5. In a compression type pipe connector of claim 1, said sealing ring being formed in the shape of a hollow cylinder, the inside diameter of the sealing ring being approximately equal to the outside diameter of the small end of the body portion of said retaining ring.

6. In a compression type pipe connector of claim 1, said retaining ring having V-shaped slits in the body portion thereof, said V-shaped slits opening outwardly towards the smaller end of said retaining ring.

* * * * *